(12) United States Patent
Shimizu et al.

(10) Patent No.: US 7,465,918 B2
(45) Date of Patent: Dec. 16, 2008

(54) ROTATION ANGLE SENSOR DEVICE FOR DETECTING ROTATION ANGLE OF A ROTARY SHAFT

(75) Inventors: Masaru Shimizu, Kyoto (JP); Toru Arakawa, Hyogo (JP); Hideki Tsukaoka, Fukui (JP); Toshihiro Nomura, Fukui (JP); Tsutomu Maeda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 174 days.

(21) Appl. No.: 11/357,978

(22) Filed: Feb. 22, 2006

(65) Prior Publication Data

US 2006/0208176 A1    Sep. 21, 2006

(30) Foreign Application Priority Data

Mar. 17, 2005    (JP) ............................. 2005-076812

(51) Int. Cl.
*G01D 5/34* (2006.01)
*G01B 7/30* (2006.01)
*F16H 13/10* (2006.01)

(52) U.S. Cl. ............................ 250/231.15; 324/207.25; 476/45; 476/65

(58) Field of Classification Search ............. 250/231.13, 250/231.15; 476/45, 65, 66; 267/137; 324/207.25
See application file for complete search history.

(56) References Cited

U.S. PATENT DOCUMENTS 6,341,426 B1 * 1/2002 Okumura ..................... 33/1 PT
6,552,533 B2 * 4/2003 Schodlbauer et al. .. 324/207.22
2004/0145364 A1 * 7/2004 Onishi et al. ............. 324/207.2

FOREIGN PATENT DOCUMENTS

JP    2005-003625    1/2005

* cited by examiner

*Primary Examiner*—Georgia Y. Epps
*Assistant Examiner*—Brian J Livedalen
(74) *Attorney, Agent, or Firm*—Wenderoth, Lind & Ponack, L.L.P.

(57) ABSTRACT

A rotation angle detector is provided with a spring to thrust a rotary body against protrusions formed on an inner wall of an opening via a detector body in a manner to keep the rotary body rotatable without any play in a linked motion with a steering shaft. As a result, the detector can detect rotation angles of the steering shaft with high accuracy.

19 Claims, 4 Drawing Sheets

ROTATION ANGLE SENSOR DEVICE FOR DETECTING ROTATION ANGLE OF A ROTARY SHAFT

FIELD OF THE INVENTION

The present invention relates to a rotation angle detector used for a steering wheel of an automobile or the like.

BACKGROUND OF THE INVENTION

FIG. 4 is an exploded perspective view of a rotation angle detector of the prior art. Rotary body 51 is disposed in case 52 in a rotatable manner with cylindrical portion 51C inserted in opening 52A. When used in an automobile, a steering shaft (not show in the figure) is inserted in center hole 51D, and rotary body 51 is then engaged with the steering shaft by means of boss 51B.

Detector body 53 is placed rotatably in case 52 in a manner to connect with rotary body 51 through engagement of gear 53A with gear 51A. Permanent magnet 54 is fixed to the center of detector body 53. Another detector body 55 is placed rotatably in case 52, and it connects with detector body 53 through engagement between gears 53A and 55A. The number of cogs of gear 53A differs from that of gear 55A. Permanent magnet 56 is fixed to the center of detector body 55. Wiring board 57 is placed above detector bodies 53 and 55, and magnetic sensors 58 and 59 are mounted on wiring board 57 in respective positions confronting permanent magnets 54 and 56.

When the steering shaft rotates, rotary body 51, detector body 53 and detector body 55 also rotate in a linked motion with the steering shaft. Magnetic sensors 58 and 59 detect the rotations of permanent magnets 54 and 56 respectively, and send detecting signals to control circuit 60 provided with a microcomputer. The detecting signals of magnetic sensors 58 and 59 differ in cycle and phase from each other because the numbers of cogs are different between gears 53A and 55A.

Control circuit 60 calculates a rotation angle of rotary body 51, that is, the rotation angle of the steering shaft, by executing a predetermined operation according to the two detecting signals and the numbers of cogs of the respective gears. The prior art technique discussed above is shown in Japanese Patent Unexamined Publication, No. 2005-3625.

In the conventional rotation angle detector discussed above, however, there is a problem that it is difficult to detect the rotation angle with high accuracy because rotary body 51 rotates eccentrically due to a gap between cylindrical portion 51C and opening 52A.

SUMMARY OF THE INVENTION

A rotation angle detector of the present invention comprises: a rotary body rotatable in a linked motion with a steering shaft; a case having an opening for rotatably supporting the rotary body inserted therein; a detector body rotatable in a linked motion with the rotary body; and a thrusting device for providing thrust on one of the rotary body and the detector body in a direction of the other, wherein the opening is provided with a plurality of protrusions formed on an inner wall thereof. The rotary body thrust by the thrusting device stays in pressed contact with the plurality of protrusions at all times, and thereby becomes rotatable without any play and eccentricity. As a result, the detector can detect rotation angles with high accuracy.

DETAILED DESCRIPTION OF PREFERRED EMBODIMENTS

Referring to the accompanying drawings, description is provided hereinafter of the exemplary embodiments of the present invention.

First Exemplary Embodiment

Figure 1:
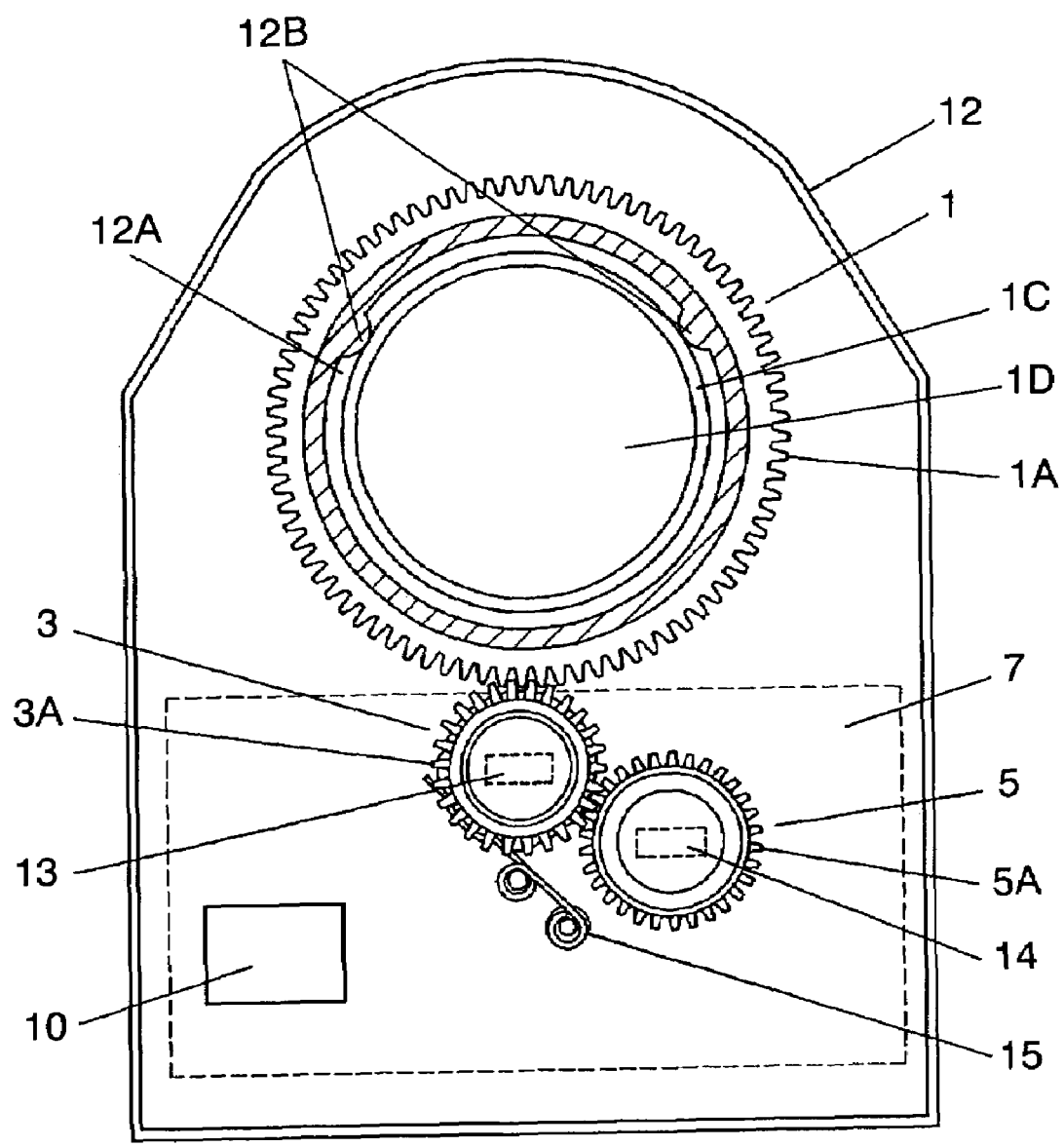
FIG. 1 is a top view of a rotation angle detector according to a first exemplary embodiment of the present invention.
Figure 2:
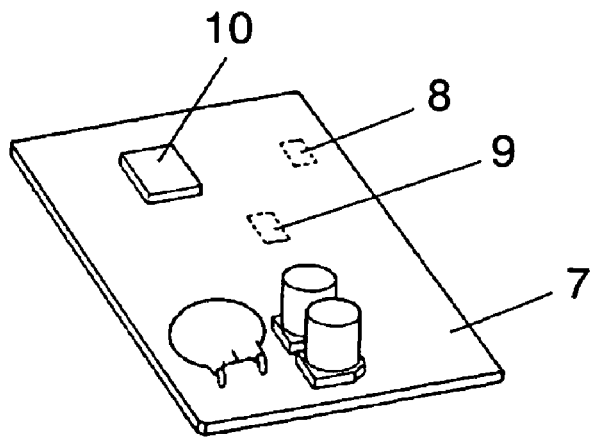
FIG. 2 is an exploded perspective view of the same rotation angle detector.
Figure 2:
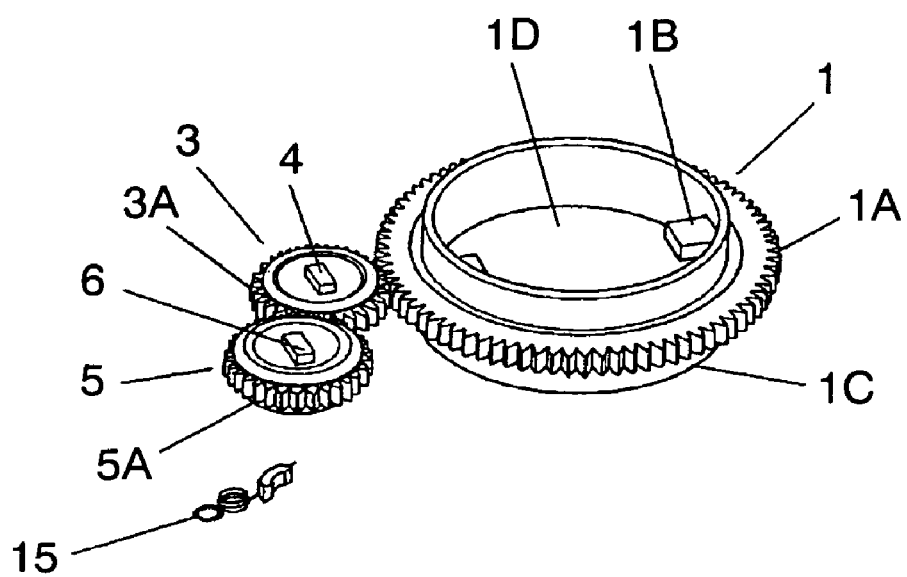
Figure 2:
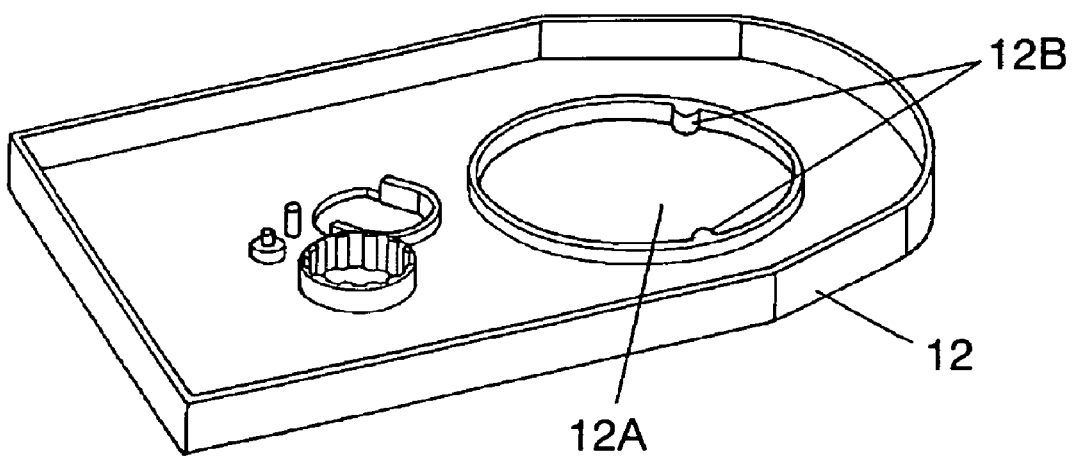

FIG. 1 is a top view of a rotation angle detector according to the first exemplary embodiment of this invention, and FIG. 2 is an exploded perspective view of the same. Rotary body 1 provided with gear 1A is disposed in case 12 made of a synthetic resin in a rotatable manner with cylindrical portion 1C inserted in opening 12A. Opening 12A has a dimension slightly larger than that of cylindrical portion 1C. When used in an automobile, a steering shaft (not shown) is inserted in center hole 1D, and rotary body 1 is then engaged with the steering shaft by means of boss 1B.

First detector body 3 is placed rotatably in case 12 in a manner to connect with rotary body 1 through engagement of gear 3A with gear 1A. Permanent magnet 4 is fixed to the center of first detector body 3 by insertion molding or the like method.

Second detector body 5 is placed rotatably in case 12 and connects with first detector body 3 through engagement between gears 3A and 5A. The number of cogs of gear 3A differs from that of gear 5A. Permanent magnet 6 is fixed to the center of second detector body 5.

Wiring board 7 is placed above first and second detector bodies 3 and 5. Magnetic sensors 8 and 9 are mounted on wiring board 7 in respective positions confronting permanent magnets 4 and 6.

Permanent magnet 4 and magnetic sensor 8 constitute first detector device 13 for detecting rotation of first detector body 3, and permanent magnet 6 and magnetic sensor 9 constitute second detector device 14 for detecting rotation of second detector body 5.

Spring 15 made of steel or copper alloy serving as a thrusting device has its one end fixed to case 12, and the other end providing thrust on first detector body 3 in a direction of rotary body 1.

A plurality of protrusions 12B are formed on an inner wall of opening 12A in locations at both sides symmetrical with respect to the center line of the thrust in an area sustaining a pressure of the thrust.

Rotary body 1 thrust by first detector body 3 stays in pressed contact with the plurality of protrusions 12B.

FIG. 1 shows a structure in which rotary body 1 is retained by two protrusions 12B forming an angle of about 120 degrees with respect to the center of opening 12A. This structure is suitable since it can retain rotary body 1 in a well balanced state.

When the steering shaft rotates, rotary body 1, first detector body 3 and second detector body 5 also rotate in a linked motion with the steering shaft. Magnetic sensors 8 and 9 detect the rotations of permanent magnets 4 and 6 respectively, and send detecting signals to control circuit 10 provided with a microcomputer. The detecting signals of magnetic sensors 8 and 9 differ in cycle and phase from each other since the numbers of cogs are different between gears 3A and 5A.

Control circuit 10 calculates a rotation angle of rotary body 1, i.e., the rotation angle of the steering shaft by executing a predetermined operation according to the two detecting signals and the numbers of cogs of the respective gears, and sends the result to an electronic circuit inside a compartment of the automobile (not shown) through a signal line (not shown).

Rotary body 1 thrust by spring 15 via first detector body 3 stays in contact with the plurality of protrusions 12B at all times, and the rotary body 1 can thus rotate without any play and eccentricity. As a result, the detector can detect rotation angles with high accuracy.

Rotary body 1, first detector body 3 and second detector body 5 may each be provided with a material of high friction such as a rubber roller around the periphery instead of the cogs, so as to make them rotatable in the linked motion by their friction.

Second Exemplary Embodiment

Figure 3:
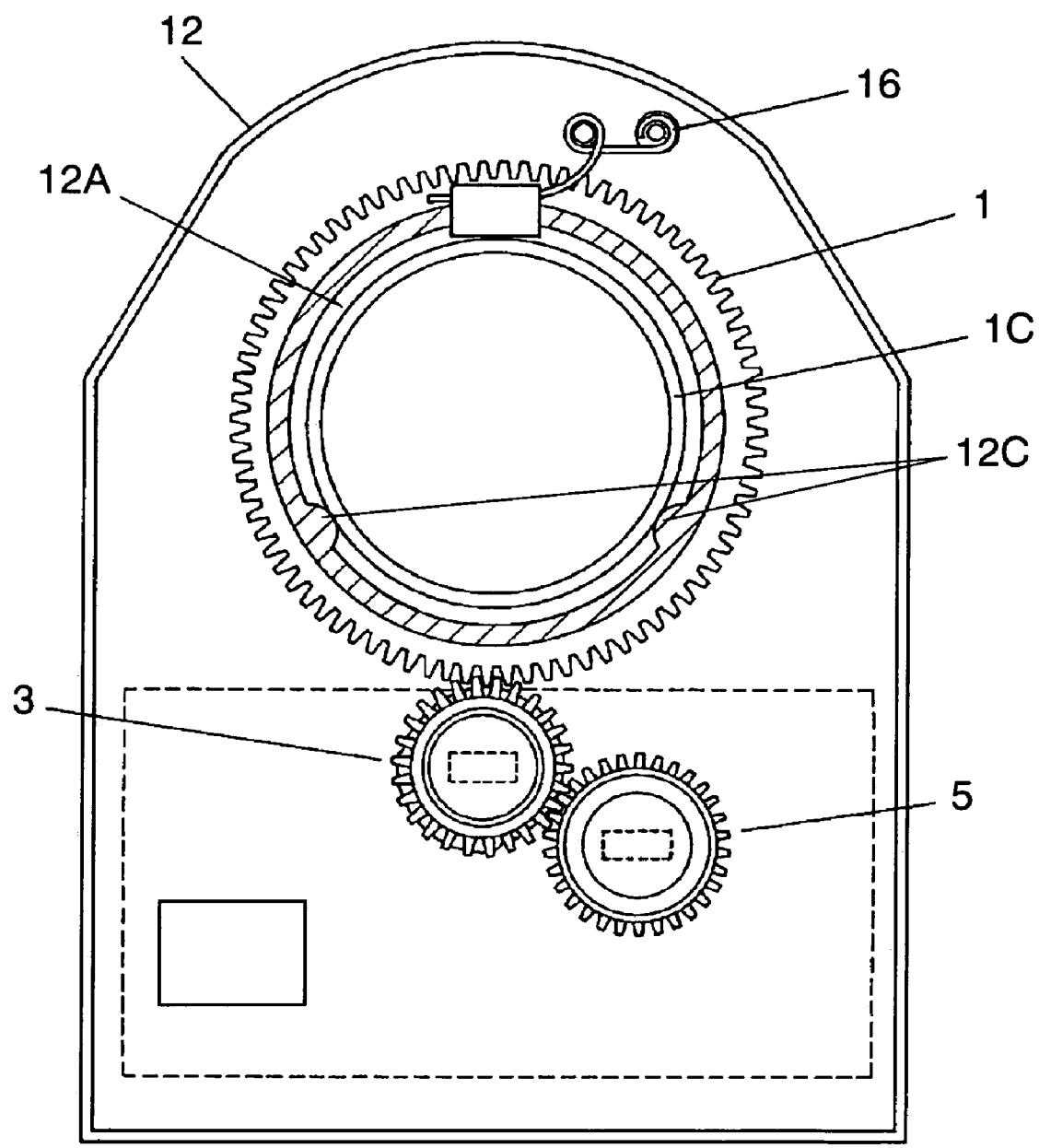
FIG. 3 is a top view of a rotation angle detector according to a second exemplary embodiment of the present invention.
Figure 4:
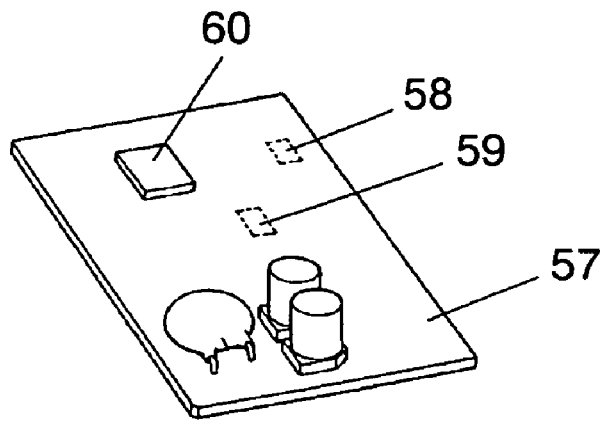
FIG. 4 is an exploded perspective view of a rotation angle detector of the prior art.
Figure 4:
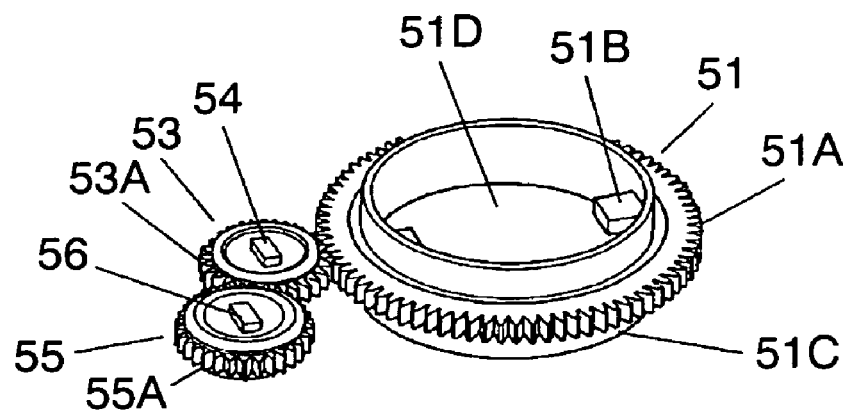
Figure 4:
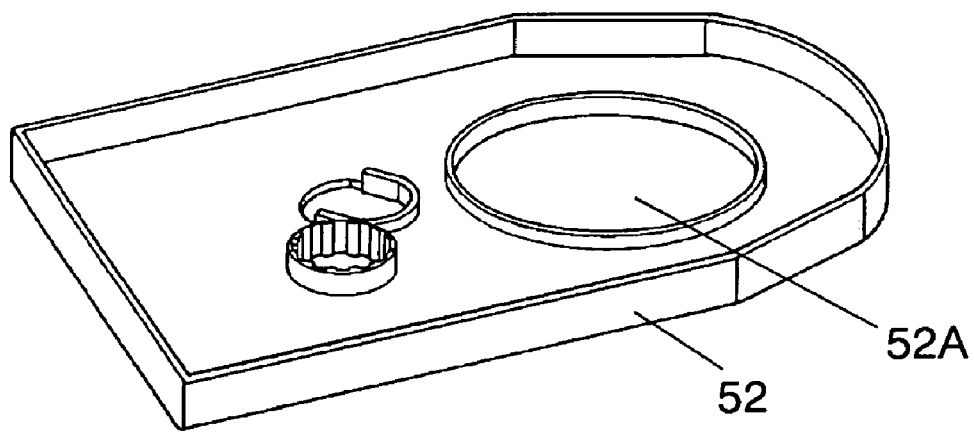

FIG. 3 is a top view of a rotation angle detector according to the second exemplary embodiment of this invention. Spring 16 serving as a thrusting device thrusts rotary body 1 in a direction of first detector body 3. A plurality of protrusions 12C are formed on an inner wall of opening 12A in locations at both sides symmetrical with respect to the center line of the thrust in an area sustaining a pressure of the thrust. Rotary body 1 thrust by spring 16 stays in pressed contact with the plurality of protrusions 12C. The structure here is identical to that of the first exemplary embodiment except that it is not provided with spring 15. Rotary body 1 thrust by spring 16 stays in contact with the plurality of protrusions 12C at all times, and the rotary body 1 can thus rotate without any play and eccentricity. As a result, the detector can detect rotation angles with high accuracy in the like manner as the first exemplary embodiment.

What is claimed is:

1. A rotation angle sensing device comprising:
a case having an opening therethrough, said opening being defined by an opening inner wall;
a rotary body rotatably supported in said opening of said case and configured to be rotatable together with a steering shaft;
a first detector body mounted in said case and engaged with said rotary body so as to rotate with rotation of said rotary body;
a first detector device arranged to detect rotation of said first detector body and generate a first rotation detection signal;
a control circuit configured to detect a rotation angle of said rotary body based on said first rotation detection signal;
a plurality of protrusions formed on said opening inner wall and protruding radially inwardly from said opening inner wall into said opening of said case; and
a thrusting device arranged to thrust one of said rotary body and said first detector body toward the other of said rotary body and said first detector body such that said rotary body is pressed toward and into contact against said protrusions protruding radially inwardly from said opening inner wall so that, during rotation of said rotary body relative to said case, said rotary body rotates in sliding contact with said protrusions, to prevent play and eccentricity of said rotary body during rotation thereof.

2. The rotation angle sensing device according to claim 1, wherein
said protrusions are provided in locations symmetrically disposed about a center line of a thrust direction of a force applied by said thrusting device.

3. The rotation angle sensing device according to claim 2, further comprising
a second detector body mounted in said case and engaged with said first detector body so as to rotate with rotation of said first detector body; and
a second detector device arranged to detect rotation of said second detector body and generate a second rotation detection signal;
wherein said control circuit is configured to detect the rotation angle of said rotary body based on both said first rotation detection signal and said second rotation detection signal.

4. The rotation angle sensing device according to claim 3, wherein
said rotary body, said first detector body, and said second detector body are all rotatable about different rotation axes.

5. The rotation angle sensing device according to claim 4, wherein
said first detector body is engaged with said rotary body by mutual engagement of outer peripheral portions of said first detector body and said rotary body; and
said second detector body is engaged with said first detector body by mutual engagement of outer peripheral portions of said second detector body and said first detector body.

6. The rotation angle sensing device according to claim 4, wherein
said rotary body has gear teeth at an outer peripheral portion thereof;
said first detector body has gear teeth at an outer peripheral portion thereof;
said second detector body has gear teeth at an outer peripheral portion thereof;
said first detector body is engaged with said rotary body by mutual engagement of said gear teeth of said first detector body and said gear teeth of said rotary body; and
said second detector body is engaged with said first detector body by mutual engagement of said gear teeth of said second detector body and said gear teeth of said first detector body.

7. The rotation angle sensing device according to claim 1, further comprising
a second detector body mounted in said case and engaged with said first detector body so as to rotate with rotation of said first detector body; and
a second detector device arranged to detect rotation of said second detector body and generate a second rotation detection signal;
wherein said control circuit is configured to detect the rotation angle of said rotary body based on both said first rotation detection signal and said second rotation detection signal.

8. The rotation angle sensing device according to claim 7, wherein
said rotary body, said first detector body, and said second detector body are all rotatable about different rotation axes.

9. The rotation angle sensing device according to claim 8, wherein said first detector body is engaged with said rotary body by mutual engagement of outer peripheral portions of said first detector body and said rotary body; and said second detector body is engaged with said first detector body by mutual engagement of outer peripheral portions of said second detector body and said first detector body.

10. The rotation angle sensing device according to claim 8, wherein said rotary body has gear teeth at an outer peripheral portion thereof;

said first detector body has gear teeth at an outer peripheral portion thereof;

said second detector body has gear teeth at an outer peripheral portion thereof;

said first detector body is engaged with said rotary body by mutual engagement of said gear teeth of said first detector body and said gear teeth of said rotary body; and said second detector body is engaged with said first detector body by mutual engagement of said gear teeth of said second detector body and said gear teeth of said first detector body.

11. The rotation angle sensing device according to claim 1, wherein said rotary body and said first detector body are rotatable about different rotation axes.

12. The rotation angle sensing device according to claim 11, wherein said first detector body is engaged with said rotary body by mutual engagement of outer peripheral portions of said first detector body and said rotary body.

13. The rotation angle sensing device according to claim 11, wherein said rotary body has gear teeth at an outer peripheral portion thereof;

said first detector body has gear teeth at an outer peripheral portion thereof; and said first detector body is engaged with said rotary body by mutual engagement of said gear teeth of said first detector body and said gear teeth of said rotary body.

14. The rotation angle sensing device according to claim 1, wherein said first detector body is engaged with said rotary body by mutual engagement of outer peripheral portions of said first detector body and said rotary body.

15. The rotation angle sensing device according to claim 1, wherein said rotary body has gear teeth at an outer peripheral portion thereof;

said first detector body has gear teeth at an outer peripheral portion thereof; and said first detector body is engaged with said rotary body by mutual engagement of said gear teeth of said first detector body and said gear teeth of said rotary body.

16. A rotation angle sensing device comprising:

a case having an opening therethrough, said opening being defined by an opening inner wall;

a rotary body rotatably supported in said opening of said case and configured to be rotatable together with a steering shaft;

a first detector body mounted in said case and engaged with said rotary body so as to rotate with rotation of said rotary body;

a first detector device arranged to detect rotation of said first detector body and generate a first rotation detection signal;

a second detector body mounted in said case and engaged with said first detector body so as to rotate with rotation of said first detector body;

a second detector device arranged to detect rotation of said second detector body and generate a second rotation detection signal;

a control circuit configured to detect a rotation angle of said rotary body based on both said first rotation detection signal and said second rotation detection signal;

a plurality of protrusions formed on said opening inner wall of said opening of said case; and a thrusting device arranged to thrust one of said rotary body and said first detector body toward the other of said rotary body and said first detector body such that said rotary body is pressed toward and into contact against said protrusions formed on said opening inner wall so that, during rotation of said rotary body relative to said case, said rotary body rotates in sliding contact with said protrusions, to prevent play and eccentricity of said rotary body during rotation thereof;

wherein said rotary body, said first detector body, and said second detector body are all rotatable about different rotation axes.

17. The rotation angle sensing device according to claim 16, wherein said protrusions are provided in locations symmetrically disposed about a center line of a thrust direction of a force applied by said thrusting device.

18. The rotation angle sensing device according to claim 16, wherein said first detector body is engaged with said rotary body by mutual engagement of outer peripheral portions of said first detector body and said rotary body; and said second detector body is engaged with said first detector body by mutual engagement of outer peripheral portions of said second detector body and said first detector body.

19. The rotation angle sensing device according to claim 16, wherein said rotary body has gear teeth at an outer peripheral portion thereof;

said first detector body has gear teeth at an outer peripheral portion thereof;

said second detector body has gear teeth at an outer peripheral portion thereof;

said first detector body is engaged with said rotary body by mutual engagement of said gear teeth of said first detector body and said gear teeth of said rotary body; and said second detector body is engaged with said first detector body by mutual engagement of said gear teeth of said second detector body and said gear teeth of said first detector body.

* * * * *